Oct. 13, 1964 — F. CLIFFORD — 3,152,713
VESSELS
Filed July 2, 1962

INVENTOR
Frank Clifford
By *[signature]*
ATTORNEYS

United States Patent Office 3,152,713
Patented Oct. 13, 1964

3,152,713
VESSELS
Frank Clifford, Darlington, England, assignor to
Whessoe Limited, Darlington, England
Filed July 2, 1962, Ser. No. 206,602
7 Claims. (Cl. 220—15)

It is known to support a vessel, which bears an internal load, on the upper ends of a series of vertical support members arranged around the periphery of the vessel, each support member being freely pivotable in a vertical plane extending radially of the vessel, whereby the vessel is free to expand and contract in radial directions due to variations in temperature and internal pressure; the internal load is supported from the wall of the vessel by a series of similar support members resting their lower ends on the interior of the walls of the vessel and supporting the internal load at their upper ends, the members again being pivotable in vertical radial planes to allow for differential expansion and contraction of the vessel and its contents. If the internal support members are aligned with the external members, the walls of the vessel are not subjected to any bending stresses due to the weight of the internal load. Supporting means of the above nature are described and claimed in the specifications of our British Patents Nos. 813,621, 813,622 and 813,624.

If a vessel supported in this manner is subjected to a horizontal force, the support members which are pivotable in planes parallel with the line of action of the force cannot offer any resistance to the force, but those members which are pivotable in planes perpendicular to the line of action of the force are capable of resisting the force. These members (and, to a lesser extent, those members pivotable in planes lying at angles between 0° and 90° to the line of action of the force), are subjected to combined shear and bending stresses and, consequentially, so are the walls of the vessel engaged by these members. These conditions are acceptable when the horizontal forces acting are relatively small in comparison with the weight of the vessel, but if these forces are large compared with the weight of the vessel, the bending and shear stresses induced in the walls of the vessel can become excessive.

In the case, for example, of a vessel mounted in an ocean-going ship and supporting a heavy internal load, the vessel and its contents may be subjected to horizontal acceleration forces of up to some 5 g and vertical forces up to some 3 g, due largely to the pitching, rolling and yawing movements of the ship, and the shear and bending stresses induced in the walls of the vessel would be very considerable.

Undue stresses may also arise in the case of a vessel which, although normally stationary, is sometimes mobile. Another case is that of a vessel erected in an earthquake zone, where the foundations of the vessel may be subject to linear or rotational accelerations in any direction.

In accordance with the present invention, in a structure comprising a vessel bearing an internal load, the vessel being supported in an elevated position, and support members of the general character described above, the support members are inclined inwardly and upwardly and extend towards the centre of gravity of the supported load.

One form of structure in accordance with the invention and a modification thereof are described below with reference to the accompanying drawings, in which.

Figure 1:
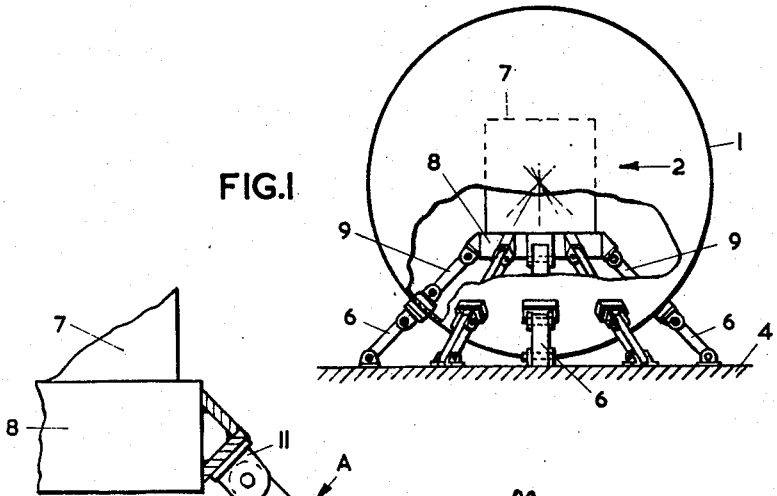
FIGURE 1 is a diagrammatic side elevation of one form of structure, partly broken away.
Figure 2:
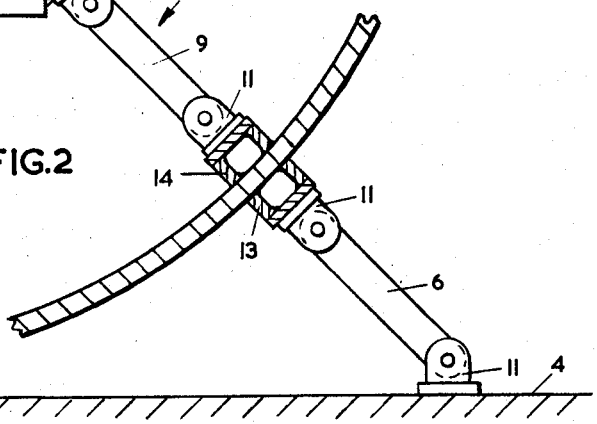
FIGURE 2 is a sectional side elevation of part of the structure shown in FIGURE 1, drawn to a larger scale.
Figure 3:
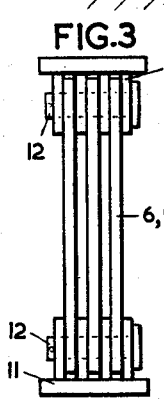
FIGURE 3 is a view in the direction of the arrow A in FIGURE 2.

The structure illustrated in FIGURES 1, 2 and 3 comprises a vessel 1 bearing an internal load 2. The vessel is supported in elevated position above a rigid foundation 4 by means of a plurality of external support members 6 which are arranged about the periphery of the vessel. The load, which comprises an internal structure 7 mounted on a support ring 8, is supported from the wall of the vessel on the upper ends of a plurality of internal support members 9, each of which is aligned with one of the external members 6. All of the members 6 and 9 lie on the surface of a cone having its apex at or close to the centre of gravity of the vessel and the load.

The support members are of laminated construction, being fabricated, say by welding, from metal plates. Alternate plies of each member are extended to form a comb and are received at their ends in slots formed in hinge blocks 11, to which they are connected by pivot pins 12. The lower hinge block 11 of each external member 6 is secured to the foundation 4, and the upper block 11 is secured to a reinforced portion 13 of the wall of the vessel 1. In similar manner, the lower hinge block 11 of each internal support member 9 is secured to a reinforced portion 14 on the interior of the vessel wall, and the upper hinge block to the support ring 8. Each pivot pin 12 is perpendicular to a vertical plane extending radially of the vessel and passing through the pin, so that the support members are capable of rocking movement as a whole in vertical radial planes to accommodate differential expansion and contraction of the vessel, its contents and the foundation.

Figures 4, 5:
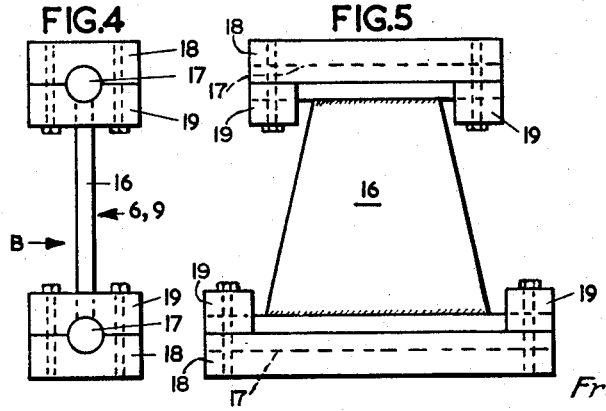
FIGURE 4 is a view corresponding with FIGURE 3, illustrating a modification.
FIGURE 5 is a view in the direction of the arrow B in FIGURE 4.

A modified form of support member, illustrated in FIGURES 4 and 5, comprises a metal plate 16 to whose ends are welded bars 17. These bars are received in bearing blocks 18 to which they are held by plummer blocks 19 in a manner which allows the bars to rotate so that they can act as pivot pins. The bearing blocks 18 of each external support member 6 are secured to the foundation 4 and a reinforced portion 13 respectively, and the bearing blocks 18 of each internal member 9 are secured to a reinforced portion 14 and to the ring 8, respectively.

When the vessel is at rest, its weight is taken by the support members 6 and 9 in compression, but if a horizontal force acts on the vessel say in a North-South direction, the compression stresses are decreased in members on the North side of the vessel and increased in those on the South side, and if the force acting is of sufficient magnitude, the members on the North side may be put in tension. Members at 90° to the force, i.e. those on the East and West sides, act to stabilise the Northern and Southern members and are there re-subjected to relatively small shear and bending stresses.

Various modifications can of course be made within the scope of the invention defined in the appended claims. For example, the support members, instead of being hingedly connected may be formed as part rollers having cylindrical surfaces at their upper and lower ends, these surfaces being curved about horizontal axes which are perpendicular to the radii of the vessel passing through the respective members. The curved surfaces at the lower ends of the external members may rest on the rigid foundation 4 while those at the upper ends are in supporting engagement with the reinforced portions 13 of the vessel. The internal members rest their lower curved surfaces against the reinforced portions 14 within the vessel and their upper curved surfaces support the ring 8 on which the internal structure 7 is mounted. If support members of this type are used, it may be necessary to provide means for holding the vessel and the load down against a tendency to lift off the supports due to high acceleration forces.

I claim:

1. In a structure comprising a rigid foundation, a vessel supported in an elevated position above said foundation, and an internal load in said vessel, the improvement which comprises a plurality of external support members arranged about the periphery of the vessel, said support members resting their lower ends on the rigid foundation and supporting the vessel at their upper ends, a plurality of internal support members resting their lower ends on the wall of the vessel and supporting the load at their upper ends, said internal support members being aligned with said external members, said internal and external members being inclined inwardly and upwardly and extending towards the center of gravity of the vessel and the load, and a plurality of pivot pins connecting said support members with said foundation, said vessel and said load, respectively, each said pivot pin extending perpendicular to the vertical radial plane through the respective support member, whereby said pivot pins are adapted to allow rocking movement of said support members in vertical planes extending radially of the vessel.

2. In a structure comprising a rigid foundation, a vessel supported in an elevated position above said foundation, and an internal load in said vessel, the improvement which comprises a plurality of external support members arranged about the periphery of the vessel, said support members resting their lower ends on the rigid foundation and supporting the vessel at their upper ends, a plurality of internal support members resting their lower ends on the wall of the vessel and supporting the load at their upper ends, said internal support members being aligned with said external members, said internal and external members being inclined inwardly and upwardly and extending towards the center of gravity of the vessel and the load, and a plurality of horizontal pivotal connections between said support members and said foundation, said vessel and said load, respectively, each said connection having a pivotal axis which extends perpendicular to the vertical radial plane through the respective support member, whereby said connections are adapted to allow a rocking movement of said support members in vertical planes extending radially of the vessel.

3. A structure in accordance with claim 2, in which the said external support members are connected by pivot pins at their lower ends to the foundation and at their upper ends to the wall of the vessel.

4. A structure in accordance with claim 2, in which each of the external support members is formed as a part roller, having at its lower end a curved surface which rests upon the rigid foundation, and at its upper end a curved surface which has supporting engagement with the wall of the vessel.

5. A structure in accordance with claim 2, in which each of the internal support members is formed as a part roller, having at its lower end a curved surface which rests upon the wall of the vessel, and having at its upper end a curved surface which has supporting engagement with the internal load.

6. A structure in accordance with claim 5, comprising means which prevent movement of the support members away from the internal load, and from the wall of the vessel, respectively.

7. A structure as claimed in claim 4 comprising means which prevent movement of the support members away from the foundation and from the wall of the vessel respectively.

References Cited in the file of this patent

UNITED STATES PATENTS

| | | |
|---|---|---|
| 2,672,253 | Lindberg | Mar. 16, 1954 |
| 2,706,575 | Soherr | Apr. 19, 1955 |